(12) United States Patent
Shigemori et al.

(10) Patent No.: US 9,802,223 B2
(45) Date of Patent: Oct. 31, 2017

(54) COATING METHOD AND HARDENER FOR POLYURETHANE PAINT

(71) Applicant: Bayer MaterialScience AG, Monheim am Rhein (DE)

(72) Inventors: Tomokazu Shigemori, Amagasaki (JP); Hiroshi Morita, Shijonawate (JP)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 14/410,183

(22) PCT Filed: Jul. 3, 2013

(86) PCT No.: PCT/EP2013/064030
§ 371 (c)(1),
(2) Date: Dec. 22, 2014

(87) PCT Pub. No.: WO2014/009220
PCT Pub. Date: Jan. 16, 2014

(65) Prior Publication Data
US 2015/0322290 A1     Nov. 12, 2015

(30) Foreign Application Priority Data

Jul. 9, 2012  (JP) ................. 2012-153298
Nov. 9, 2012  (JP) ................. 2012-247541

(51) Int. Cl.
| | |
|---|---|
| B05D 7/00 | (2006.01) |
| C09D 175/06 | (2006.01) |
| C08G 18/02 | (2006.01) |
| C08G 18/79 | (2006.01) |
| C08G 18/62 | (2006.01) |
| C08G 18/73 | (2006.01) |
| C08G 18/78 | (2006.01) |
| C08G 18/80 | (2006.01) |
| C09D 175/04 | (2006.01) |

(52) U.S. Cl.
CPC .............. *B05D 7/532* (2013.01); *B05D 7/53* (2013.01); *C08G 18/02* (2013.01); *C08G 18/022* (2013.01); *C08G 18/6229* (2013.01); *C08G 18/6254* (2013.01); *C08G 18/73* (2013.01); *C08G 18/7818* (2013.01); *C08G 18/7831* (2013.01); *C08G 18/7837* (2013.01); *C08G 18/79* (2013.01); *C08G 18/791* (2013.01); *C08G 18/792* (2013.01); *C08G 18/80* (2013.01); *C08G 18/8061* (2013.01); *C09D 175/04* (2013.01); *C09D 175/06* (2013.01); *Y10T 428/31551* (2015.04); *Y10T 428/31554* (2015.04)

(58) Field of Classification Search
None
See application file for complete search history.

(56) References Cited

U.S. PATENT DOCUMENTS

| | | | |
|---|---|---|---|
| 4,759,961 A | 7/1988 | Kato et al. | |
| 5,626,917 A * | 5/1997 | Brock | B05D 7/532 |
| | | | 427/407.1 |
| 6,090,939 A | 7/2000 | Richter et al. | |
| 6,590,098 B2 | 7/2003 | Richter et al. | |
| 2004/0106762 A1 | 6/2004 | Charriere et al. | |
| 2011/0281965 A1 | 11/2011 | Laas et al. | |
| 2015/0147577 A1 * | 5/2015 | Shigemori | B05D 7/532 |
| | | | 428/423.1 |

FOREIGN PATENT DOCUMENTS

| | | |
|---|---|---|
| CA | 2244486 A1 | 2/1999 |
| JP | S61161179 A | 7/1986 |
| JP | H09271714 A | 10/1997 |
| JP | H11152320 A | 6/1999 |
| JP | 2000086640 A | 3/2000 |
| JP | 2001226626 A | 8/2001 |
| JP | 2004534870 A | 11/2004 |
| WO | WO-9907765 A1 | 2/1999 |

OTHER PUBLICATIONS

Bayer MaterialScience; Raw Materials for Automotive Refinish Systems; Feb. 2005.*
International Search Report for PCT/EP2013/064030 mailed Nov. 4, 2013.

* cited by examiner

*Primary Examiner* — Michael P Rodriguez
(74) *Attorney, Agent, or Firm* — Drinker Biddle & Reath LLP

(57) ABSTRACT

[Problem] In a coating method of a two-coat one-bake system where a clear coat paint is coated after a base coat paint is coated, then these two coated layers are simultaneously hardened, adhesive strength between the two coated layers is to increase in comparison with the conventional method.
[Solution] Provided is a coating method; A specific hardener is used in the clear coat paint. The hardener is one containing a polyisocyanate derived from 1,6-hexamethylene diisocyanate, satisfying all the following conditions:
1) Hardener does not virtually include diisocyanate monomer,
2) Viscosity of hardener is not more than 1000 mPa·s/23° C.,
3) Content of HDI trimer in hardener is not less than 60 weight %, and
4) Content of HDI dimer in hardener is less than 10 weight %.

7 Claims, No Drawings

COATING METHOD AND HARDENER FOR POLYURETHANE PAINT

CROSS-REFERENCE TO RELATED APPLICATIONS

This application is a national stage application (under 35 U.S.C. §371) of PCT/EP2013/064030, filed Jul. 3, 2013, which claims benefit of Japanese Application No. 2012-153298, filed Jul. 9, 2012, and Japanese Application No. 2012-247541, filed Nov. 9, 2012, all of which are incorporated herein by reference in their entirety.

TECHNICAL FIELD

The present invention relates to a paint having excellent physical properties such as high adhesive strength between coated layers and high water resistance in a two-coat one-bake coating system in coating to steel plates and plastics of automobiles, home electric appliances and the like.

BACKGROUND ART

In coating to steel plates and plastics of automobiles, home electric appliances and the like, for the purpose of shortening of coating process and energy saving, there have been widely adopted a coating method called a wet-on-wet system, or a two-coat one-bake (occasionally three-coat one-bake, for example) system. In these coating systems, for the purpose of VOC (volatile organic compound) reduction at the same time, for paints used in a base layer and an intermediate coating layer, a low VOC paint, for example, an aqueous paint is often used.

However, since paints used in a base layer and an intermediate coating layer have not reached the level, of two-component reaction-type coated layers in terms of coated film performance, there occur problems such as poor adhesiveness, solvent resistance and water resistance, so methods for improving these drawbacks have been required.

In Patent Documents 1 and 2, there is described a method where a paint composed of a resin containing hydroxyl and carboxyl groups and a catalyst is coated as a base coat, next, a clear coat consisting mainly of a hydroxyl group-containing resin and a polyisocyanate compound is coated so that the isocyanate compound in the clear coat paint is partially penetrated into the base coat for hardening.

Patent Document 3 describes that aiming at a similar effect of partially transferring an isocyanate compound in a clear coat into a base coat, as a hardener of the clear coat, a polyisocyanate containing 1 weight % or more, 70 weight % or less of dimer (also called uretdione) of 1,6-hexamethylene diisocyanate (hereinafter, also referred to as HDI) is used in a range of 1.2 to 3.0 in NCO/OH ratio.

PRIOR ART DOCUMENT

Patent Document

[Patent Document 1] Japanese Unexamined Patent Publication No. JP S61-161179A

[Patent Document 2] Japanese Unexamined Patent Publication No. JP H9-271714A

[Patent Document 3] Japanese Unexamined Patent Publication No. JP 2001-226626A

SUMMARY OF THE INVENTION

Problems to be Solved by the Invention

In the methods of Patent Documents 1 and 2, however, there is a case where an isocyanate compound does not penetrate enough to cross-link a base coat, and there have been cases with problems in adhesiveness between coated film layers, solvent resistance or the like. In the method of Patent Document 3, since a dimer of 1,6-hexamethylene diisocyanate has an isocyanate functionality of 2, the degree of cross-linking in the coated film layer is low, and there are problems such as inferior solvent resistance, weather resistance and the like.

Means to Solve the Problems

The present inventors have found that by using a specific polyisocyanate as a hardener in a clear coat paint, the polyisocyanate in the clear coat penetrates well and efficiently into a base coat of the under layer to react with an isocyanate reactive component in the base coat, thus, adhesive strength between the clear coat layer and base coat layer is greatly increased, and completed the present invention.

Embodiment of the present invention is as follows:

[Paragraph 1]

A coating method, which is a two-coat one-bake system including that a base coat paint including an active hydrogen-containing resin is coated, without its hardening by cross-linking, subsequently a clear coat paint including a hardener and an active hydrogen-containing resin is coated on the base coat, then the base coat and clear coat are simultaneously hardened by cross-linking, characterized in that the clear coat paint is a two-pack polyurethane paint with a mole ratio of 0.9 to 2.0 in NCO/H (active hydrogen), and the hardener includes a polyisocyanate derived from 1,6-hexamethylene diisocyanate, and satisfies all the following conditions:

1) Hardener does not virtually include diisocyanate monomer.
2) Viscosity of hardener when it is not diluted with any organic solvent is not more than 1000 mPa·s/23° C.
3) Content of 1,6-hexamethylene diisocyanate trimer in hardener is not less than 60 weight %.
4) Content of 1,6-hexamethylene diisocyanate dimer in hardener is less than 10 weight %.

[Paragraph 2]

The method of paragraph 1, wherein the hardener for the clear coat paint contains not less than 13 mole % of iminooxadiazinedione ring of 1,6-hexamethylene diisocyanate.

[Paragraph 3]

The method of paragraph 1 or 2, characterized in that the base paint includes an active hydrogen-containing resin and a blocked isocyanate.

[Paragraph 4]

A hardener for a clear coat paint, which is used in the method of any one of paragraphs 1 to 3.

[Paragraph 5]

A multilayer coated film consisting of a base coat layer and a clear coat layer, which is obtained by the method of any one of paragraphs 1 to 3.

Effect of the Invention

Adhesive strength between a base coat layer and a clear coat layer is greatly improved, thereby obtaining excellent physical properties of coated film (for example, excellent solvent resistance, water resistance and adhesiveness). This is thought as a result that polyisocyanate in a clear coat penetrates well and efficiently into a base coat present beneath to react with an isocyanate reactive component in the base coat.

MODE FOR CARRYING OUT THE INVENTION

Hereinafter, the present invention will be explained in detail.

The coating method in the present invention is a coating method of a two-coat one-bake system. In the method, a base coat paint including an active hydrogen-containing resin is coated to form base coat, without cross-linking hardening the base coat, subsequently a clear coat paint including a hardener and an active hydrogen-containing resin (two-component reaction-type polyurethane paint) is coated on the base coat to form clear coat, then the base coat and clear coat are simultaneously hardened by cross-linking. This coating method is sometimes called a wet-on-wet system. In some cases, the base coat is double layered to be a three-coat one-bake system, or multiple layered than that, which is also included in the coating method of the present invention.

After coating a base coat, usually, in order to prevent layer mixing with a clear coat to be coated later, it is preferable to volatilize volatile contents included in the base coat (for example, solvent, water) to some extent to dry up to finger-touch drying according to JIS K 5600-1-1, or up to an extent of half-hardening. Drying is conducted under the conditions of about 1 to 10 minutes (particularly about 3 minutes) at room temperature for a solvent with high volatility, and of about 1 to 10 minutes (particularly about 3 minutes) at about 50 to 100° C. for a solvent with low volatility, or for the case including water.

The heating condition after coating the clear coat is generally at a temperature of about 80 to 180° C. for about 1 minute to 3 hours (particularly about 10 to 60 minutes). In the case that the heating condition is restricted, since the hardener for coating a clear coat of the present invention is reactive at room temperature, it can be hardened over a long time at room temperature without heating.

The present invention, in this coating method, relates to a hardener for a clear coat to form a polyurethane multilayer coated film, and to the coated film of the polyurethane resin formed. The present inventors studied keenly on effective hardeners in this coating method. As a result, they have discovered that by selectively using a specific polyisocyanate as a hardener for a clear coat, the hardener penetrates sufficiently into the base coat and further cross-links, accordingly, the polyurethane multilayer coated film obtained can form physical properties of coated film including excellent adhesiveness, and completed the present invention.

The base coat paint includes an active hydrogen-containing resin. The clear coat paint (two-component urethane paint) includes a hardener and an active hydrogen-containing resin.

A specific hardener herein is a polyisocyanate satisfying all the following conditions.

The hardener is one that includes a polyisocyanate derived from 1,6-hexamethylene diisocyanate (HDI) alone, and that may include a polyisocyanate derived from an aliphatic or alicyclic diisocyanate other than HDI;
1) Hardener does not virtually include HDI diisocyanate monomer,
2) Viscosity of hardener when it is not diluted with any organic solvent is not more than 1000 mPa·s/23° C.,
3) Content of HDI trimer in hardener is not less than 60 weight %, and
4) Content of HDI dimer in hardener is less than 10 weight %, In this invention viscosity of hardener means the viscosity of hardener when it is not diluted with any organic solvent even if it is diluted in actual use.

The hardener is a polyisocyanate derived from a diisocyanate. The hardener is composed mainly of polyisocyanate derived from HDI monomer. The polyisocyanate synthesized from HDI is 60 weight % or more relative to the hardener, preferably 70 weight % or more, more preferably 90 weight % or more, for example 95 weight % or more. A polyisocyanate derived from diisocyanate monomers other than HDI (for example, aliphatic or alicyclic diisocyanate monomers such as isophorone diisocyanate, dicycloliexyl-methane 4,4'-diisocyanate and norbornane diisocyanate) can be used in a range satisfying the conditions of hardener of the present invention.

As auxiliary materials (generally, not more than 30 weight % of hardener) for synthesizing a polyisocyanate from diisocyanate monomers, there are listed a catalyst, co-catalyst, active hydrogen compound, reaction terminator and the like which are known in the art to be used for synthesis of polyisocyanate, and these may be used as needed.

It is possible to mix a hardener with solvents inert to polyisocyanate (ethyl acetate, butyl acetate, toluene, xylene, solvent naphtha, and the like), but it is preferable not to use solvents from the point of VOC reduction.

In order to use the polyisocyanate of the present invention industrially, it is preferable from the point of working environments not to include virtually diisocyanate monomers. The amount of diisocyanate monomers included in polyisocyanate is preferably 1 weight % or less, further preferably 0.5 weight % or less, and particularly 0.25 weight % or less. Ordinarily, this condition is satisfied by a process for removing diisocyanate monomers under reduced pressure from a raw product obtained after completion of reaction.

The main component of the polyisocyanate used in the present invention is a trimer of HDI. This trimer includes an isocyanurate structure of HDI, an iminooxadiazinedione structure of HDI, or both structures thereof.

The trimer of HDI in the present invention means a polyisocyanate having an isocyanurate group formed by trimerizing three molecules of HDI, or an iminooxadiazinedione group being an isomeric structure of an isocyanurate group. In the polyurethane coatings industry, as a polyisocyanate component composed of HDI, biuret groups and allophanate groups containing polyisocyanates have been widely utilized. However, for forming these biuret group and allophanate group, elimination of $CO_2$ and/or addition of alcohols are involved. Thus, these are not referred to the trimer of HDI in the present invention. Uretdione is a dimer formed by two molecule addition of HDI.

In the actual synthesis of polyisocyanate, a composition of the higher molecular sideproduct exceeding a trimer is often produced. For example, a pentamer and heptamer of HDI having an isocyanurate group can be found. These have an isocyanurate structure, but these are not a trimer of course, and do not fall under the category of trimer of HDI in the present invention.

As a production method of polyisocyanate derived from 1,6-hexamethylene diisocyanate (HDI) used in the present invention, any method is adopted as long as the production method produces an isocyanurate group and/or iminooxadiazinedione group by using HDI. For example, there are listed the publicly known methods described in Japanese Unexamined Patent Publications No. H11-152320, No. 2000-086640, Japanese Translation of PCT publication No. 2004-534870 and US Patent No. 2011/0281965.

As a specific example of the production method of polyisocyanate, there are listed a production method (Japanese Unexamined Patent Publication No. H11-152320) characterized by oligomerization under the presence of hydrogen polyfluoride oligomerizing catalyst, a method (Japanese Unexamined Patent Publication No. 2000-086640) by trimerization under the presence of quaternary ammonium and phosphonium fluoride trimerizing catalyst, and a method (Japanese Translation of PCT publication No. 2004-534870) by trimerization under the presence of catalyst being a salt-like compound having a 1,2,3- and/or 1,2,4-triazolate structure.

When the amount of HDI trimer is 60 weight % or more relative to the hardener, penetration of polyisocyanate from a clear coat to a base coat takes place sufficiently, and since the functionality is 3, physical properties of coated film after heat hardening becomes sufficient.

Regarding the hardener, it is preferable that the amount of iminooxadiazinedione ring of HDI is 13 mole % or more relative to the total of isocyanurate ring and iminooxadiazinedione ring, particularly 25 mole % or more, for example 30 to 80 mole %. In the present invention, it has been found that in particular, the iminooxadiazinedione structure contributes efficiently to the lowering of viscosity of hardener, improvement of penetrability into the under layer, and improvement of physical properties of coated film.

The hardener needs to satisfy the following conditions: Dimer of HDI in hardener is less than 10 weight %, and Viscosity of hardener is not more than 1000 mPa·s/23° C.

When the amount of dimer of HDI exceeds 10 weight % relative to the hardener, since dimer (uretdione) is difunctional, cross-linking performance of coated film is poor, water resistance, adhesiveness between layers and the like are inferior. In the case that the viscosity exceeds 1000 mPa·s/23° C., since the fraction of transferring polyisocyanate in a clear coat into a base coat becomes small (it is inferred that polyisocyanate with a higher molecular weight prevents the penetration into the under layer.), no sufficient performance in water resistance, adhesiveness, and the like can be exhibited.

As a component other than a trimer and dimer of HDI, there is the foregoing polyisocyanate having a biuret group or allophanate group, as for the polyisocyanate with a biuret structure as a main component, the viscosity becomes 1000 mPa·s/23° C. or more, penetration into the under layer (base coat) becomes insufficient. As for the polyisocyanate with an allophanate structure as a main component, the viscosity can be reduced, but functionality lowers if monoalcohols are incorporated, in the same way, as the dimer, thus, cross-linking performance of coated film is poor, and water resistance, adhesiveness between layers and the like are inferior. The degree of penetration into the under layer is also low.

In the case of not satisfying the conditions of hardener of the present invention, since functionality lowers or degree of penetration into the under layer is insufficient, water resistance of coated film, adhesiveness between layers and the like cannot be obtained sufficiently.

On the other hand, various kinds of modified type polyisocyanates other than a trimer and dimer of HDI can be used in a range satisfying the conditions of hardener of the present invention. Various kinds of modified type polyisocyanates may be mixed for preparation of a hardener satisfying the conditions of hardener of the present invention.

The ratio of polyisocyanate used in the present invention to an active hydrogen-containing resin used in a clear coat is 0.9 to 2.0 in a mole ratio represented by NCO/H (isocyanate group/active hydrogen atom), and particularly, a range of 0.9 to 1.2 in NCO/H ratio is preferable. A range of 1.0 to 1.2 in NCO/H mole ratio is further preferable.

When the mole ratio is less than 0.9, since the amount of polyisocyanate transferred from a clear coat to a base coat becomes small, sufficient cross-linking cannot be formed, thereby deteriorating water resistance, adhesiveness, and the like. The polyisocyanate of the present invention is high in functionality and can form high-performance coated film with a small amount of penetration, thus, it needs no excessive NCO/H mole ratio. On the other hand, when the mole ratio is more than 2.0, retardation of reactivity occurs due to an excessive polyisocyanate, and also this is not preferable economically. Sufficiently high physical properties of coated film can be exhibited by NCO/H mole ratio of 0.9 to 1.2.

The resin used in a base paint comprises a resin containing isocyanate reactive active hydrogen. Specifically, a resin having a hydroxyl group or carboxyl group is listed. There can be used an acrylic resin, polyester resin, alkyd resin, polyurethane resin, and the like having active hydrogen which are used in the art. In particular, from the viewpoint of VOC reduction, a water-dispersible hydroxyl group-containing acrylic resin is suitable. For example, content of active hydrogen is preferably 0.01 to 2 weight %. In the present Description, "content of active hydrogen" means a weight ratio (weight %) of active hydrogen atom to the weight of resin. Generally, the content of hydroxyl group is 0.1 to 15 weight %, and preferably 0.2 to 10 weight %. Generally, there is used a resin with an acid value of 0 to 60 mg KOH/g, preferably 0 to 40 mg KOH/g, a number-averaged molecular weight of 500 to 1,000,000 preferably 2,000 to 300,000.

The combination of these resins and a melamine resin can also be used. As the melamine resin, an alkyl-etherified melamine resin suitable for water-solubilization is preferable. The mixing ratio of these active hydrogen-containing resins and a melamine resin is preferably 100:3 to 60 in the weight ratio of nonvolatile contents.

As a base paint, there is used an active hydrogen-containing resin alone, or a one-pack paint in concomitant use with a blocked polyisocyanate, as needed. As the blocked polyisocyanates, they may be polyisocyanates having either one of biuret, isocyanurate, urethane, uretdione and allophanate groups obtained from 1,6-hexamethylene diisocyanate and/or isophorone diisocyanate that are blocked with well-known blocking agents such as oximes, lactams, active methylene, pyrazoles compounds, for example, can be blocked with compounds such as 2-butanone oxime, ethyl acetoacetate, diethyl malonate and dimethyl pyrazole. These blocked polyisocyanates can be arbitrarily selected according to the baking conditions.

In the case of using a blocked polyisocyanate, the ratio of active hydrogen-containing resin and blocked polyisocyanate is preferably not more than 0.8 in an effective NCO/H mole ratio. As a base coat paint, there can be used a solid color paint using an inorganic and organic pigment used usually in the field, and also a metallic pigment and pearl pigment using metal fine powder such as scale-like aluminum and micaceous iron oxide.

As a resin for a base coat paint, in order to promote hardening of polyisocyanate transferred from a clear coat and hardening of blocked polyisocyanate blended in a base paint, there may be used a hardening catalyst used in the field, for example, an organic metal compound, acidic phosphate ester and tertiary amine compound. As these compounds, there can be used, for example, dibutyltin dilaurate, dioctyltin dilaurate, dibutyltin diacetate, tetrabutyldiacetoxydistannoxane, lead naphthenate, cobalt naphthenate, lead 2-ethylhexanoate, iron 2-ethylhexanoate, monobutyl phosphate, phosphoric acid dibutoxy ester, triethylenediamine and the like.

A resin used in a clear coat paint comprises a resin containing isocyanate reactive active hydrogen. Specifically, a resin having a hydroxyl group or carboxyl group is listed. There can be used an acrylic resin, polyester resin, alkyd resin, polyurethane resin, and the like containing active hydrogen used in the art. The active hydrogen in an active hydrogen-containing resin used in a clear coat paint is preferably a hydroxyl group. In particular, a hydroxyl group-containing acrylic resin is suitable. For example, there is used one with the content of active hydrogen of 0.01 to 2 weight %, an acid value of 0 to 60 mg KOH/g, preferably 0 to 40 mg KOH/g, and a number-averaged molecular weight of 500 to 50,000 preferably 500 to 20,000. For example, when an active hydrogen-containing resin has a hydroxyl group, the content of hydroxyl group is 0.1 to 15 weight %, and preferably 0.2 to 10 weight %.

There may be added a hardening catalyst used in the field in the same way as a base paint, for example, an organic metal compound, acidic phosphate ester and tertiary amine compound.

The coating method is not particularly limited, an atomizing system, brush coating, roll system, soaking system, doctor blade system and the like can be applied. Among these, in particular, an atomizing system such as air spray, airless spray and electrostatic coating is preferable. Regarding dry film thickness, it is preferable to coat so as to be 5 to 100 μm, preferably 10 to 30 μm for a base coat layer, and 5 to 200 μm, preferably 20 to 80 μm for a clear coat layer.

A substrate to be coated may be various materials, for example, metal and resin (for instance plastic).

EXAMPLES

Next, the present invention will be further specifically explained by Examples, but the present invention is by no means restricted by Examples. Representation of "%" means "weight %" if not otherwise specified.

Evaluation method was carried out according to the following criteria to evaluate each characteristic.

<Measurement of Content of Trimer and Dimer of HDI in Polyisocyanate>

It was obtained by efflux area percentage obtained through measurement by gel permeation chromatography (GPC). The peak of the molecular weight corresponding to a trimer or dimer of HDI is defined as trimer or dimer. The measurement conditions are as follows.

Measuring apparatus: HLC-8120GPC manufactured by Tosoh Corporation
 Column: Shodex KF601, 602, 603 each piece
 Carrier: Tetrahydrofuran
 Detection method: Differential refractometer
 Pretreatment: Active NCO group was deactivated by the reaction with methanol before the measurement.
 Molecular weight: PPG (polypropylene glycol) reduction <Measurement of Molecular Weight of Acrylic Resin>

Molecular weight of acrylic resin was measured by the same GPC method as described above except the pretreatment of active NCO group.

<Measurement of Viscosity of Hardener>

Viscosity of hardener was measured according to DIN EN ISO 3219/A.3 at 23° C.

<Quantitative Determination of Isocyanurate Ring and Iminooxadiazinedione Ring in Polyisocyanate>

By NMR spectroscopy ($^{13}$C-NMR), the quantitative determination was conducted by observing an absorbing region specific to the ring structure. As a measuring apparatus, DPX400 manufactured by Bruker Corp. was used. It was done at a frequency of 100 MHz using a sample of about 50% in dry $CDCl_3$. As a frequency reference, 77.0 ppm of solvent ($CDCl_3$) was used. The data on chemical shift of a target compound was quoted from documents (see Die Angewandte Makromolekulare Chemie 1986, 141, 173-183, and documents quoted there), or obtained by the measurement of model substances. The result is expressed as the mole ratio (mole %) of isocyanurate ring and iminooxadiazinedione ring.

<Evaluation on Penetrability of Polyisocyanate from Clear Coat to Base Coat>

A clear coat paint is coated on the base coat that was coated on a polypropylene plate. This is heat-baked, the resulting coated film was kept at normal temperature, then peeled off from the polypropylene plate. Within 1 hour after heat-baking, infrared absorption spectrum (IR) of coated film of the base coat on the polypropylene plate surface side was measured in a peak height of the following wavelengths, and respective IR absorption peak height ratios (%) of 2270 $cm^{-1}$ relative to 2930 $cm^{-1}$ and 700 $cm^{-1}$ were calculated. Higher these ratios, higher the penetration efficiency of polyisocyanate is shown.

Wavelength 2930 $cm^{-1}$ (C—H stretching vibration absorption)

Wavelength 2270 $cm^{-1}$ (isocyanate group —N=C=O stretching vibration absorption)

Wavelength 700 $cm^{-1}$ (aromatic ring absorption)

In the infrared absorption spectrum (IR) measurement, a measuring apparatus used was Nicolet 6700FT-IR manufactured by Thermo Fisher Scientific Inc.

Regarding the determination, when the peak height ratio (%) becomes not less than 3 times the blank test that no clear coat was coated (high penetrability), it denotes "○", when less than 3 times the blank (low penetrability), "×."

<Appearance of Coated Film>

The appearance of coated film obtained was evaluated by naked eye in accordance with the following criteria.

○: smoothness is good.
Δ: smoothness is intermediate between "good" and "bad."
×: smoothness is bad.

<Water Resistance Adhesiveness Between Layers>

A polypropylene coated film plate (see Example 1) obtained by coating of primer for polypropylene then heat-baking of clear coat was soaked in warm water of 40° C. for 240 hours, and picked up, dried at room temperature for 12 hours. The coated film was cut with a utility knife so as to reach the substrate surface, and 100 grids of 2 mm×2 mm size were made, and an adhesive cellophane tape was attached on the coated surface, after the tape was rapidly peeled off at 20° C., the coated surface was evaluated by the following criteria.

○: grids of coated film remains 100.
Δ: grids of coated film are peeled by 1 to 10 pieces.
×: grids of coated film are peeled by 11 pieces or more.

<Cohesion Failure Property>

Regarding the sample after the above-described evaluation of adhesiveness between water resistance layers, the failure state of the grids of coated film was evaluated by the following criteria.

○: no failure is observed at all inside the base coated film.

x: failure is clearly observed inside the base coated film.

For Examples and Comparative examples, the following each material was prepared beforehand.

Acrylic Polyol A (For Base Coat)
Bayhydrol A2427 (manufactured by Bayer MaterialScience AG)
Water-dispersion type hydroxyl group-containing acrylic polyol, nonvolatile content 42%, hydroxyl group content 2% (in terms of nonvolatile content), viscosity 100 mPa·s/23° C., pH 8-9, glass transition temperature 87° C., molecular weight Mw/Mn=240000/22000

Melamine Resin (For Base Coat)
Cymel 327 (manufactured by Cytec Industries, Inc.), methyl-etherified melamine resin Blocked Isocyanate A (For Base Coat)
Desmodur BL3475 (manufactured by Bayer MaterialScience AG)
Blocked isocyanate obtained by polyisocyanate composed of HDI and IPDI (isophorone diisocyanate) with an active methylene compound, solvent naphtha/butyl acetate solution with nonvolatile content of 75%, rate of blocked isocyanate 8.2%, viscosity 1000 mPa·s/23° C.

Aluminum Flake (For Base Coat)
EMR D5660 (manufactured by Toyo Aluminium KK)

Viscosity Modifier (For Base Coat)
Viscalex HV30 (manufactured by Ciba Speciality Chemicals, Inc.)

Surfactant A (For Base Coat)
A mixture of surfactant BYK347 (manufactured by BYK Corp.) and surfactant Disperlon AQ320 (manufactured by Kusumoto Chemicals, Ltd.) by 1:1

Co-Solvent (For Base Coat)
Butyl glycol

Neutralizing Agent (For Base Coat)
Dimethylethanolamine

Acrylic Polyol B (For Clear Coat)
Desmophen A870 (manufactured by Bayer MaterialScience AG)
Butyl acetate solution with nonvolatile content of 70%, hydroxyl group content 2.95% as it is, glass transition temperature 27° C., viscosity 3500 mPa·s/23° C., acid value 7.5 mg KOH/g, molecular weight Mw/Mn=3400/1650

Surfactant B (For Clear Coat)
BYK331 being surfactant (manufactured by BYK Corp.)

Leveling Agent (For Clear Coat)
Modaflow (Manufactured by Monsanto Corporation)

Solvent (For Clear Coat)
Methoxypropyl acetate/butyl acetate=1/1 solution

Formation Example 1

Synthesis of Hardener A:

A three-neck flask equipped with a stirring device was filled with nitrogen, 200 g of HDI was put therein and kept at 60° C. Next, as a catalyst, 50% solution of tetrabutyl phosphonium hydrogen difluoride in isopropanol/methanol (2:1) was added dropwise over 4 hours until NCO content of coarse reaction solution became 43%. Thereafter, the reaction was stopped by adding dibutyl phosphate of 103 mg. From this, HDI monomer was removed by thin-film distillation at 130° C./0.2 millibars, thereby obtaining a polyisocyanate with the following data.

Nonvolatile content: 100% (containing no solvent)
NCO content: 23.4%
Viscosity: 680 mPa·s/23° C.
Trimer content: 68 weight %
Dimer content: 4.0 weight %
HDI monomer content: 0.2 weight %
Mole ratio of isocyanurate ring and Iminooxadiazinedione ring: 55:45

Formation Example 2

Synthesis of Hardener B:

A. Preparation of Catalyst Solution

2-Ethylhexanol of 600 g was added to 100 g of 40% solution of N,N,N-trimethyl-N-benzyl-ammonium hydroxide in methanol, and stirred. Next, methanol was removed under reduced pressure of a tap aspirator at 30-40° C. while the solution was sufficiently stirred. To this concentrate solution, 2-ethylhexanol was added for adjusting the catalyst concentration to about 0.5%.

B. Synthesis from HDI

A three-neck flask equipped with a stirring device was filled with nitrogen, 3200 g of HDI was put therein and kept at 60° C. Next, the above-described catalyst solution of 32 g was added dropwise over 30 minutes. Next, stirring was continued for 2 hours keeping the temperature at 60 to 65° C. The NCO content of a raw product at this time was 43.8%. Then, the reaction was stopped by adding 0.32 g of 25% solution of dibutyl phosphate in HDI. After the liquid was cooled down to room temperature, unreacted HDI was removed by thin-layer distillation at 130° C./0.2 millibars, thereby obtaining a polyisocyanate with the following data.

Nonvolatile content: 100% (containing no solvent)
NCO group content: 23.0%
Viscosity: 1200 mPa·s/23° C.
HDI monomer content: 0.2 weight %
Trimer content: 67 weight %
Dimer content: 0.5 weight %
Mole ratio of isocyanurate ring and iminooxadiazinedione ring: 95:5

Formation Example 3

Synthesis of Hardener C:

A three-neck flask equipped with a stirring device was filled with nitrogen, 1000 g of HDI was put therein and kept at 60° C. To this, 10 g of 1,3-butanediol as a co-catalyst and 3 g of tri-n-butylphosphine as a catalyst were added. Next, this mixture was kept at 60° C., underwent reaction for 4 hours, obtaining a coarse reaction mixture with NCO content of 40%. The reaction was stopped by adding methyl p-toluenesulfonate of 2.8 g thereto. This was subjected to thin-layer distillation at 130° C. and at a pressure of 0.15 mbar, thereby obtaining a polyisocyanate with the following data.

Nonvolatile content: 100% (containing no solvent)
NCO content: 21.8%
Viscosity: 200 mPa·s/23° C.
Trimer content: 24 weight %
Dimer content: 38 weight %
HDI monomer content: 0.2 weight %
Mole ratio of isocyanurate ring and Iminooxadiazinedione ring: 70:30

Formation Example 4

Hardeners D to H were prepared as follows.
Preparation of hardener D: hardener A and hardener C were blended by weight ratio of 85:15.
Preparation of hardener E: hardener A and hardener C were blended by weight ratio of 75:25.
Preparation of hardener F: hardener A and hardener B were blended by weight ratio of 50:50.
Preparation of hardener G: hardener A and hardener B were blended by weight ratio of 25:75.
Preparation of hardener H: hardener A and hardener B were blended by weight ratio of 15:85.

Formation Example 5

Synthesis of Hardener 1 (HDI Allophanate-Modified Type Polyisocyanate):

A three-neck flask equipped with a stirring device was filled with nitrogen, 302 g of HDI was put therein and kept at 60° C. To this, 13.3 g of 1-butanol was added, and stirred at 60° C. for 1 hour.

Next, the temperature of a raw reaction mixture was raised to 90° C., to the reaction mixture of 90° C., 0.214 g of 4.4% solution of N,N,N-trimethyl-N-benzyl-ammonium hydroxide in 2-butanol was added. When the reaction mixture reached 35% NCO content, the reaction was stopped by adding di(2-ethylhexyl) phosphate of 0.21 g. Unreacted monomer was removed by thin-layer distillation at 130° C. and at a pressure of 0.15 mbar, thereby obtaining a polyisocyanate with the following data.
Nonvolatile content: 100% (containing no solvent)
NCO content: 20.0%
Viscosity: 500 mPa·s/23° C.
HDI monomer content: 0.2 weight %

Formation Example 6

Hardener J (HDI biuret-modified type polyisocyanate)
Desmodur N3200 manufactured by Bayer MaterialScience AG
Nonvolatile content: 100% (containing no solvent)
NCO group content: 23.0%
Viscosity: 2500 mPa·s/23° C.
HDI monomer content: 0.2 weight %

Characteristics of each hardener, such as NCO group content, viscosity, and composition are shown in Tables 1, 2.

Example 1

Base coat composition BC-1 (nonvolatile content of about 22%, Ford cup No. 4 viscosity of 50 to 60 seconds) shown in Table 3 was prepared. This was spray-coated on a polypropylene plate for the dry film thickness to be 15 to 20 microns, after it was allowed to stand at room temperature for 3 minutes, it was further dried at 80° C. for 3 minutes to obtain coated film of the base coat. Next, clear coat composition CC-1 (CC-1 and hardener of predetermined amount were mixed to yield nonvolatile content of about 50% and Ford cup No. 4 viscosity of 18 to 22 seconds.) shown in Table 4 was prepared. To this, hardener A was mixed for the NCO/OH mole ratio to be 0.9, and the mixture was spray-coated on the coated film of the base coat obtained above for the dry film thickness to be about 40 microns. After being allowed to stand at room temperature for 3 minutes, this was baked at 100° C. for 20 minutes. After cooling down to room temperature, the coated film was peeled off from the polypropylene plate.

The penetration ratio of NCO group of the coated film of base coat on the polypropylene plate surface side was measured by the above-described infrared spectrum (hereinafter abbreviated as IR) method, and the degree of penetrability of polyisocyanate from clear coat to base coat was measured.

As a blank test, the coated film obtained by coating and drying a base coat alone was subjected to the same operation to measure the IR absorption ratio.

A primer for polypropylene was prepared by mixing a commercially available chlorinated polyolefin resin with an aqueous polyurethane resin (Dispercoll U54 manufactured by Bayer MaterialScience AG). This was coated on a polypropylene plate, allowed to stand still at room temperature for 3 minutes, and dried at 80° C. for 3 minutes. Thereafter, by the method shown above, a base coat and a clear coat were sequentially coated, and baked, obtaining a target coated film. This coated film was evaluated by appearance, adhesiveness between water resistance layers and cohesion failure property.

Examples 2 to 10 and Comparative Examples 1 to 6

Experiments were conducted according to Example 1 by changing the loads of each component as shown in the base coat composition, clear coat composition, use amount of hardener and NCO/OH mole ratio of Tables 5, 6 and 7.

The results are shown by IR absorption ratio, penetrability evaluation, coated film appearance, adhesiveness between water resistance layers of Tables 5, 6 and 7.

TABLE 1

| Hardener | A | B | C | D | E |
|---|---|---|---|---|---|
| NCO group content (%) | 23.4 | 23.0 | 21.8 | 23.2 | 23.0 |
| Viscosity (mPa · s/23° C.) | 680 | 1200 | 200 | 580 | 530 |
| HDI monomer content (%) | 0.2 | 0.2 | 0.2 | 0.2 | 0.2 |
| Trimer content (%) | 68 | 67 | 24 | 61 | 57 |
| Dimer content (%) | 4.0 | 0.5 | 38 | 9.1 | 12.5 |
| Mole % of iminooxadiazinedione group* | 45 | 5 | 30 | 43 | 41 |

*Mole % ratio of iminooxadiazinedione group to the total of isocyanurate group and iminooxadiazinedione group

TABLE 2

| Hardener | F | G | H | I (Allophanate-modified) | J (Biuret-modified) |
|---|---|---|---|---|---|
| NCO group content (%) | 23.2 | 23.1 | 23.1 | 20.0 | 23.0 |
| Viscosity (mPa · s/23° C.) | 870 | 960 | 1050 | 450 | 2500 |
| HDI monomer content (%) | 0.2 | 0.2 | 0.2 | 0.2 | 0.2 |
| Trimer content (%) | 68 | 67 | 67 | — | — |
| Dimer content (%) | 2.3 | 1.4 | 1.0 | — | — |

TABLE 2-continued

| Hardener | F | G | H | I (Allophanate-modified) | J (Biuret-modified) |
|---|---|---|---|---|---|
| Mole % of iminooxadiazinedione group* | 25 | 15 | 11 | — | — |

*Mole % ratio of iminooxadiazinedione group to the total of isocyanurate group and iminooxadiazinedione group
—: Not measured or not evaluated

TABLE 3

| Base coat composition (part by weight) | BC-1 | BC-2 |
|---|---|---|
| Acrylic polyol A | 32.0 | 32.0 |
| Melamine resin | 2.5 | 0.0 |
| Blocked isocyanate A | 0.0 | 4.8* |
| Aluminum flake | 5.7 | 5.7 |
| Viscosity modifier | 3.5 | 3.5 |
| Surfactant A | 0.9 | 0.9 |
| Co-solvent | 7.4 | 7.4 |
| Neutralizing agent | 0.6 | 0.6 |
| Pure water | 47.4 | 45.1 |

*NCO/OH mole ratio of acrylic polyol A and blocked isocyanate A is 0.6.

TABLE 4

| Clear coat composition (part by weight) | CC-1 |
|---|---|
| Acrylic polyol B | 55.0 |
| Surfactant B | 0.55 |
| Leveling agent | 0.55 |
| Solvent | 38.6 |

TABLE 5

| | Example 1 | Example 2 | Example 3 | Comparative example 1 | Comparative example 2 | Comparative example 4 |
|---|---|---|---|---|---|---|
| Hardener | A | A | A | B | C | D |
| Base coat composition | BC-1 | BC-1 | BC-1 | BC-1 | BC-1 | BC-1 |
| Clear coat composition | CC-1 | CC-1 | CC-1 | CC-1 | CC-1 | CC-1 |
| Use amount of hardener* | 15.3 | 17.0 | 20.4 | 17.4 | 18.7 | 17.6 |
| NCO/OH mole ratio of clear coat composition | 0.9 | 1.0 | 1.2 | 1.0 | 1.0 | 1.0 |
| IR absorption ratio (%) 2270 $cm^{-1}$/2930 $cm^{-1}$ | 30 | 38 | 41 | 10 | 49 | 42 |
| IR absorption ratio (%) 2270 $cm^{-1}$/700 $cm^{-1}$ | 35 | 40 | 41 | 9 | 61 | 47 |
| Penetrability evaluation | ○ | ○ | ○ | x | ○ | ○ |
| Coated film appearance | ○ | ○ | ○ | ○ | Δ | ○ |
| Water resistance adhesiveness between layers | ○ | ○ | ○ | x | x | ○ |
| Cohesion failure property | ○ | ○ | ○ | x | x | ○ |

*Use amount of hardener relative to 94.7 parts of clear coat composition CC-1

TABLE 6

|  | Example 5 | Comparative example 3 | Example 6 | Example 7 | Example 8 | Comparative example 4 |
|---|---|---|---|---|---|---|
| Hardener | D | E | F | G | G | H |
| Base coat composition | BC-1 | BC-1 | BC-1 | BC-1 | BC-1 | BC-1 |
| Clear coat composition | CC-1 | CC-1 | CC-1 | CC-1 | CC-1 | CC-1 |
| Use amount of hardener* | 21.1 | 17.7 | 17.6 | 17.7 | 21.2 | 17.7 |
| NCO/OH mole ratio of clear coat composition | 1.2 | 1.0 | 1.0 | 1.0 | 1.2 | 1.0 |
| IR absorption ratio (%) 2270 cm$^{-1}$/2930 cm$^{-1}$ | — | 42 | — | 24 | — | 16 |
| IR absorption ratio (%) 2270 cm$^{-1}$/700 cm$^{-1}$ | — | 50 | — | 27 | — | 17 |
| Penetrability evaluation | — | ○ | — | ○ | — | x |
| Coated film appearance | ○ | ○ | ○ | ○ | ○ | ○ |
| Water resistance adhesiveness between layers | ○ | x | ○ | ○ | ○ | x |
| Cohesion failure property | ○ | x | ○ | ○ | ○ | x |

*Use amount of hardener relative to 94.7 parts of clear coat composition CC-1
—: Not measured or not evaluated

TABLE 7

|  | Comparative example 5 | Comparative example 6 | Example 9 | Example 10 | Blank |
|---|---|---|---|---|---|
| Hardener | I | J | A | D | — |
| Base coat composition | BC-1 | BC-1 | BC-2 | BC-2 | BC-1 |
| Clear coat composition | CC-1 | CC-1 | CC-1 | CC-1 | — |
| Use amount of hardener* | 20.4 | 17.7 | 17.0 | 17.6 | — |
| NCO/OH mole ratio of clear coat composition | 1.0 | 1.0 | 1.0 | 1.0 | — |
| IR absorption ratio (%) 2270 cm$^{-1}$/2930 cm$^{-1}$ | 3 | 7 | 40 | 43 | 7 |
| IR absorption ratio (%) 2270 cm$^{-1}$/700 cm$^{-1}$ | 3 | 8 | 44 | 44 | 6 |
| Penetrability evaluation | x | x | ○ | ○ | — |
| Coated film appearance | Δ | ○ | ○ | ○ | — |
| Water resistance adhesiveness between layers | x | x | ○ | ○ | — |
| Cohesion failure property | x | x | ○ | ○ | — |

*Use amount of hardener relative to 94.7 parts of clear coat composition CC-1
—: Not measured or not evaluated From the above-described results, it is known that Examples 1 to 8 show high IR absorption ratio, excellent adhesiveness between water resistance layers, and cohesion failure property over the NCO/OH mole ratio of 0.9 to 1.2. In particular, in the case of using a hardener containing not less than 13 mole % of iminooxadiazinedione group, it has been shown that there is a large effect for lowering the viscosity of hardener and improving penetrability to coated film. In Examples 9, 10, in the composition that a blocked isocyanate is used in a base coat, it has been assured to show excellent performance of coated film.

In contrast to this, in Comparative examples 1, 4, since viscosity exceeds 1000 mPa·s/23° C. and polyisocyanate having an iminooxadiazinedione group in trimer is less than 13 mole %, penetrability is low and sufficient adhesiveness between water resistance layers is not obtained. In Comparative examples 2, 3, although penetrability is high, the trimer of hardener is less than 60%, and the dimer is contained exceeding 10%, thus, sufficient adhesiveness between water resistance layers is not obtained. In Comparative examples 5, 6, the modified type of polyisocyanate is a hardener different from that of the present invention, and in both, penetrability is low and sufficient adhesiveness between water resistance layers is not obtained.

INDUSTRIAL APPLICABILITY

The present invention can be used in a coating method called a wet-on-wet system, or two-coat one-bake system in a coating field to steel plates and plastics of automobiles, home electric appliances and the like, aiming at shortening of coating process, energy saving and VOC (volatile organic compound) reduction. Since a specific polyisocyanate is used in a clear coat paint layer, it penetrates efficiently into a base coat paint layer of the under layer, reacts with an isocyanate reactive component in the base coat paint layer, thus, adhesive strength between two layers is greatly improved, and excellent physical properties of coated film can be formed.

The invention claimed is:

1. A coating method comprising applying a base coat paint comprising an active hydrogen-containing resin and a blocked isocyanate, without hardening the base coat paint by cross-linking, subsequently coating a clear coat paint comprising a hardener and an active hydrogen-containing resin on the base coat paint, hardening the base coat paint and the clear coat paint simultaneously by cross-linking, wherein the clear coat paint is a two-pack polyurethane paint with a mole ratio of 0.9 to 2.0 in NCO/H (active hydrogen), wherein the hardener comprises a polyisocyanate derived from 1,6-hexamethylene diisocyanate, satisfying all the following conditions:

1) the hardener includes an amount of diisocyanate monomers included in polyisocyanate of 0.25 weight % or less 2) viscosity of hardener when it is not diluted with any organic solvent is not more than 1000 mPa·s/23° C.,
3) content of 1,6-hexamethylene diisocyanate trimer in hardener is not less than 60 weight %, wherein the 1,6-hexamethylene diisocyanate trimer comprises an isocyanurate structure of HDI, an iminooxadiazinedione structure of HDI, or mixtures thereof, and
4) content of 1,6-hexamethylene diisocyanate dimer in hardener is less than 10 weight %.

2. The method of claim 1, wherein the hardener for the clear coat paint comprises not less than 13 mole % of iminooxadiazinedione ring of 1,6-hexamethylene diisocyanate relative to the total of isocyanurate ring and iminooxadiazinedione ring.

3. The method of claim 1, wherein the amount of active hydrogen is from 0.01 to 2 weight % of active hydrogen atom to the weight of resin.

4. The method of claim 1, wherein the polyisocyanate derived from 1,6-hexamethylene diisocyanate is 60 weight % or more relative to the hardener.

5. The method of claim 2, wherein the amount of iminooxadiazinedione ring of 1,6-hexamethylene diisocyanate is 25 mole % or more.

6. The method of claim 2, wherein the amount of iminooxadiazinedione ring of 1,6-hexamethylene diisocyanate is 30 to 80 mole % or more.

7. The method of claim 1, wherein the polyisocyanate derived from 1,6-hexamethylene diisocyanate is 95 weight % or more relative to the hardener.

* * * * *